United States Patent
Kumar et al.

(10) Patent No.: US 11,937,114 B2
(45) Date of Patent: Mar. 19, 2024

(54) SELECTIVE MEASUREMENT REPORTING FOR A USER EQUIPMENT

(71) Applicant: QUALCOMM Incorporated, San Diego, CA (US)

(72) Inventors: Rajeev Kumar, San Diego, CA (US); Xipeng Zhu, San Diego, CA (US); Shankar Krishnan, San Diego, CA (US); Ozcan Ozturk, San Diego, CA (US); Masato Kitazoe, Tokyo (JP); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 147 days.

(21) Appl. No.: 17/444,437

(22) Filed: Aug. 4, 2021

(65) Prior Publication Data

US 2022/0046457 A1 Feb. 10, 2022

Related U.S. Application Data

(60) Provisional application No. 63/061,592, filed on Aug. 5, 2020.

(51) Int. Cl.
*H04W 24/10* (2009.01)
*H04W 24/08* (2009.01)
*H04W 76/10* (2018.01)

(52) U.S. Cl.
CPC ........... *H04W 24/10* (2013.01); *H04W 24/08* (2013.01); *H04W 76/10* (2018.02)

(58) Field of Classification Search
CPC ...... H04W 24/10; H04W 76/10; H04W 24/08
(Continued)

(56) References Cited

U.S. PATENT DOCUMENTS 9,137,697 B2 * 9/2015 Jung ..................... H04W 24/10
9,319,915 B2 * 4/2016 Thiruvenkatachari ......................
H04W 24/10
(Continued)

FOREIGN PATENT DOCUMENTS

EP 2579641 A2 4/2013
WO WO-2020034568 A1 2/2020
(Continued)

OTHER PUBLICATIONS

Ericsson., et al., "Granular Reporting of Early Measurement Results", 3GPP TSG-RAN WG2 #109bis-e, 3GPP Draft R2-2003385, 3rd Generation Partnership Project (3GPP), Mobile Competence Centre, 650, Route Des Lucioles, F-06921 Sophia-Antipolis Cedex, France, vol. RAN WG2, No. Electronic Meeting, Apr. 20, 2020-Apr. 30, 2020, Apr. 9, 2020 (Apr. 9, 2020), 4 Pages, XP051870319, Retrieved from the Internet: URL: https://www.3gpp.org/ftp/TSG_RAN/WG2_RL2/TSGR2_109bis-e/Docs/R2-2003385.zip, R2-2003385—Granular Reporting of Early Measurement Results.docx [retrieved on Apr. 9, 2020].
(Continued)

*Primary Examiner* — Mong-Thuy T Tran
(74) *Attorney, Agent, or Firm* — Norton Rose Fulbright US LLP

(57) ABSTRACT

A method of wireless communication includes determining, based on a plurality of network measurements performed by a user equipment (UE), one or more measurement log files associated with the plurality of network measurements. The method further includes receiving, by the UE from a network device, a request associated with the one or more measurement log files. The request indicates at least one measurement filter. The method further includes transmitting, by the UE to the network device, a response to the request. The response includes first measurement results of the one or more measurement log files selected based on the
(Continued)

at least one measurement filter and excludes second measurement results of the one or more measurement log files based on the at least one measurement filter.

30 Claims, 7 Drawing Sheets

(58) Field of Classification Search
 USPC .......................................................... 370/329
 See application file for complete search history.

(56) References Cited

U.S. PATENT DOCUMENTS

| | | | |
|---|---|---|---|
| 9,572,061 B2* | 2/2017 | Jung | H04W 24/10 |
| 10,231,143 B2* | 3/2019 | Bodog | H04W 24/10 |
| 10,623,977 B2* | 4/2020 | Lundqvist | H04W 24/10 |
| 11,184,901 B2* | 11/2021 | Nilsson | H04B 7/088 |
| 11,395,165 B2* | 7/2022 | Yang | H04L 43/50 |
| 2012/0315890 A1* | 12/2012 | Suzuki | H04W 24/10 |
| | | | 455/422.1 |
| 2013/0208616 A1* | 8/2013 | Thiruvenkatachari | H04W 24/10 |
| | | | 370/252 |
| 2018/0084451 A1* | 3/2018 | Fukuta | H04W 4/70 |
| 2018/0324617 A1* | 11/2018 | Schmidt | H04L 47/2483 |
| 2020/0029239 A1 | 1/2020 | Chen et al. | |
| 2021/0344430 A1* | 11/2021 | Fang | H04B 17/29 |
| 2022/0085950 A1* | 3/2022 | Yang | H04W 76/15 |
| 2022/0132347 A1* | 4/2022 | Chang | H04W 76/19 |
| 2022/0150744 A1* | 5/2022 | Wang | H04W 24/10 |
| 2022/0295324 A1* | 9/2022 | Pantelidou | H04W 24/08 |
| 2023/0111603 A1* | 4/2023 | Ghimire | H04B 7/0421 |
| | | | 455/456.1 |

FOREIGN PATENT DOCUMENTS

| | | |
|---|---|---|
| WO | WO-2020062285 A1 | 4/2020 |
| WO | WO-2020222211 A1 | 11/2020 |

OTHER PUBLICATIONS

International Search Report and Written Opinion—PCT/US2021/071120—ISA/EPO—dated Nov. 23, 2021 (206176WO).

* cited by examiner

SELECTIVE MEASUREMENT REPORTING FOR A USER EQUIPMENT

CROSS-REFERENCE TO RELATED APPLICATIONS

This application claims the benefit of and priority to U.S. Prov. Pat. App. No. 63/061,592, entitled "SELECTIVE MEASUREMENT REPORTING FOR A USER EQUIPMENT" and filed on Aug. 5, 2020, which is expressly incorporated by reference herein in its entirety.

TECHNICAL FIELD

Aspects of the present disclosure relate generally to wireless communication systems, and more particularly, to wireless communications systems that perform and report measurements.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EXAMPLES

In some aspects of the disclosure, an apparatus for wireless communication includes a receiver and a transmitter. The receiver is configured to perform a plurality of network measurements associated with one or more measurement log files and is further configured to receive, from a network device, a request associated with the one or more measurement log files. The request indicates at least one measurement filter. The transmitter is configured to transmit, to the network device, a response to the request. The response includes first measurement results of the one or more measurement log files selected based on the at least one measurement filter, and the response excludes second measurement results of the one or more measurement log files based on the at least one measurement filter.

In some other aspects of the disclosure, a method of wireless communication includes determining, based on a plurality of network measurements performed by a user equipment (UE), one or more measurement log files associated with the plurality of network measurements. The method further includes receiving, by the UE from a network device, a request associated with the one or more measurement log files. The request indicates at least one measurement filter. The method further includes transmitting, by the UE to the network device, a response to the request. The response includes first measurement results of the one or more measurement log files selected based on the at least one measurement filter and excludes second measurement results of the one or more measurement log files based on the at least one measurement filter.

In another aspect, a non-transitory computer-readable medium stores instructions executable by a processor to perform operations. The operations include determining, based on a plurality of network measurements performed by a UE, one or more measurement log files associated with the plurality of network measurements. The operations further include receiving, by the UE from a network device, a request associated with the one or more measurement log files. The request indicates at least one measurement filter. The operations further include transmitting, by the UE to the network device, a response to the request. The response includes first measurement results of the one or more measurement log files selected based on the at least one measurement filter and excludes second measurement results of the one or more measurement log files based on the at least one measurement filter.

In another aspect, an apparatus includes a memory and one or more processors coupled to the memory. The one or more processors are configured to determine, based on a plurality of network measurements performed by a UE, one or more measurement log files associated with the plurality of network measurements. The one or more processors are further configured to receive, from a network device, a request associated with the one or more measurement log files. The request indicates at least one measurement filter. The one or more processors are further configured to transmit, to the network device, a response to the request. The response includes first measurement results of the one or more measurement log files selected based on the at least one measurement filter and excludes second measurement results of the one or more measurement log files based on the at least one measurement filter.

In another aspect, an apparatus includes means for determining, based on a plurality of network measurements performed by a UE, one or more measurement log files associated with the plurality of network measurements. The apparatus further includes means for receiving, from a network device, a request associated with the one or more measurement log files. The request indicates at least one measurement filter. The apparatus further includes means for transmitting, to the network device, a response to the request. The response includes first measurement results of the one or more measurement log files selected based on the at least one measurement filter and excludes second measurement results of the one or more measurement log files based on the at least one measurement filter.

In another aspect, an apparatus for wireless communication includes a transmitter configured to transmit, to a user equipment (UE), a request associated with one or more measurement log files. The request indicates at least one measurement filter, and the one or more measurement log files are associated with a plurality of network measurements performed by the UE. The apparatus further includes a receiver configured to receive, from the UE, a response to the request. The response includes first measurement results of the one or more measurement log files selected based on the at least one measurement filter, and the response excludes second measurement results of the one or more measurement log files based on the at least one measurement filter.

In another aspect, a method of wireless communication includes transmitting, by a network device to a UE, a request associated with one or more measurement log files. The request indicates at least one measurement filter, and the one or more measurement log files are associated with a plurality of network measurements performed by the UE. The method further includes receiving, from the UE by the network device, a response to the request. The response includes first measurement results of the one or more measurement log files selected based on the at least one measurement filter and excludes second measurement results of the one or more measurement log files based on the at least one measurement filter.

In another aspect, a non-transitory computer-readable medium stores instructions executable by a processor to perform operations. The operations include transmitting, by a network device to a UE, a request associated with one or more measurement log files. The request indicates at least one measurement filter, and the one or more measurement log files are associated with a plurality of network measurements performed by the UE. The operations further include receiving, from the UE by the network device, a response to the request. The response includes first measurement results of the one or more measurement log files selected based on the at least one measurement filter and excludes second measurement results of the one or more measurement log files based on the at least one measurement filter.

In another aspect, an apparatus includes a memory and one or more processors coupled to the memory. The one or more processors are configured to transmit, by a network device to a UE, a request associated with one or more measurement log files. The request indicates at least one measurement filter, and the one or more measurement log files are associated with a plurality of network measurements performed by the UE. The one or more processors are further configured to receive, from the UE by the network device, a response to the request. The response includes first measurement results of the one or more measurement log files selected based on the at least one measurement filter and excludes second measurement results of the one or more measurement log files based on the at least one measurement filter.

In another aspect, an apparatus includes means for transmitting, by a network device to a UE, a request associated with one or more measurement log files. The request indicates at least one measurement filter, and the one or more measurement log files are associated with a plurality of network measurements performed by the UE. The apparatus further includes means for receiving, from the UE by the network device, a response to the request. The response includes first measurement results of the one or more measurement log files selected based on the at least one measurement filter and excludes second measurement results of the one or more measurement log files based on the at least one measurement filter.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
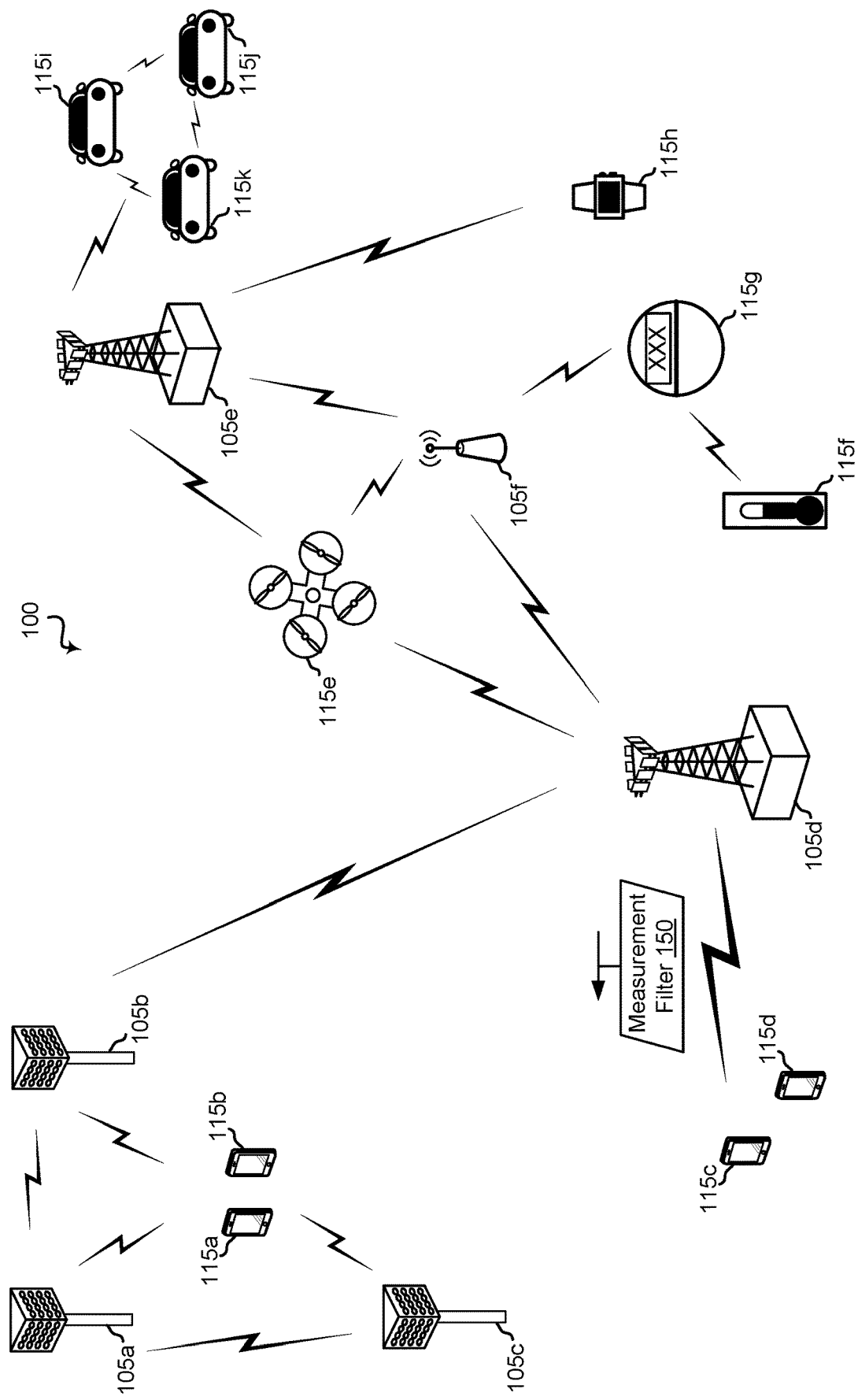
FIG. 1 is a block diagram illustrating an example of a wireless communication system according to some aspects of the disclosure.

Some wireless communication systems use network measurements to facilitate or improve quality of wireless communications. For example, a user equipment (UE) may perform minimization of drive test (MDT) measurements and may report the MDT measurements to a network device (such as a base station) in a measurement log file. The network device may use the MDT measurements to determine parameters for wireless communications between the network device and the UE.

In some cases, transmission of the measurement log file from the UE to the network device increases network traffic and delays other messages or signals. For example, in some wireless communication protocols, measurement log files and non-access stratum (NAS) communications be may be transmitted via the same signaling radio bearer (SRB). As a result, in some cases, communication of a relatively large measurement log file may delay certain NAS signals from being communicated to the network device, which may reduce system performance (e.g., by adding latency to certain system operations).

In some aspects of the disclosure, selective measurement reporting techniques enable a wireless communication system to reduce an amount of measurement data communicated by a UE to a network device. In some examples, the base station transmits to the UE a request for measurement data, and the request indicates one or more measurement filters. The UE may apply the one or more measurement filters to the one or more measurement log files to identify first measurement results to be provided in a response to the request and to identify second measurement results to be excluded from the request. In some implementations, the UE transmits a message indicating information (e.g., metadata) associated with the one or more measurement log files, such as availability of the one or more measurement log files, a file size of the one or more measurement log files, or a data size of one or more portions of the one or more measurement log files 450 (such as a data size associated with a particular measurement type of the one or more measurement log files).

Selective measurement reporting in accordance with some aspects of the disclosure may improve performance of a wireless communication system. For example, by selectively communicating measurement results, communication of a large measurement log file may be avoided (or delayed) in cases. As a result, delays associated with communication of other signals or messages (such as NAS messages) may be reduced or avoided. As another example, in some cases, an amount of measurement data received, stored, and analyzed by the network device may be reduced. As a result, an amount storage and processing resources of the network device used for the measurement data may be reduced in some cases.

To further illustrate, the disclosure relates generally to wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km^2), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km^2), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be implemented in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as internet of everything (IoE) or internet of things (IoT) devices. UEs 115a-115d are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such as UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

In some aspects, a base station 105 may transmit an indication of a measurement filter 150 to one or more UEs 115 to enable measurement filtering. To illustrate, the example of FIG. 1 illustrates that the base station 105 may transmit an indication of the measurement filter 150 to the UE 115c. Alternatively or in addition, an indication of the measurement filter 150 may be transmitted by one or more other base stations 105, may be received by one or more other UEs 115, or both.

Figure 2:
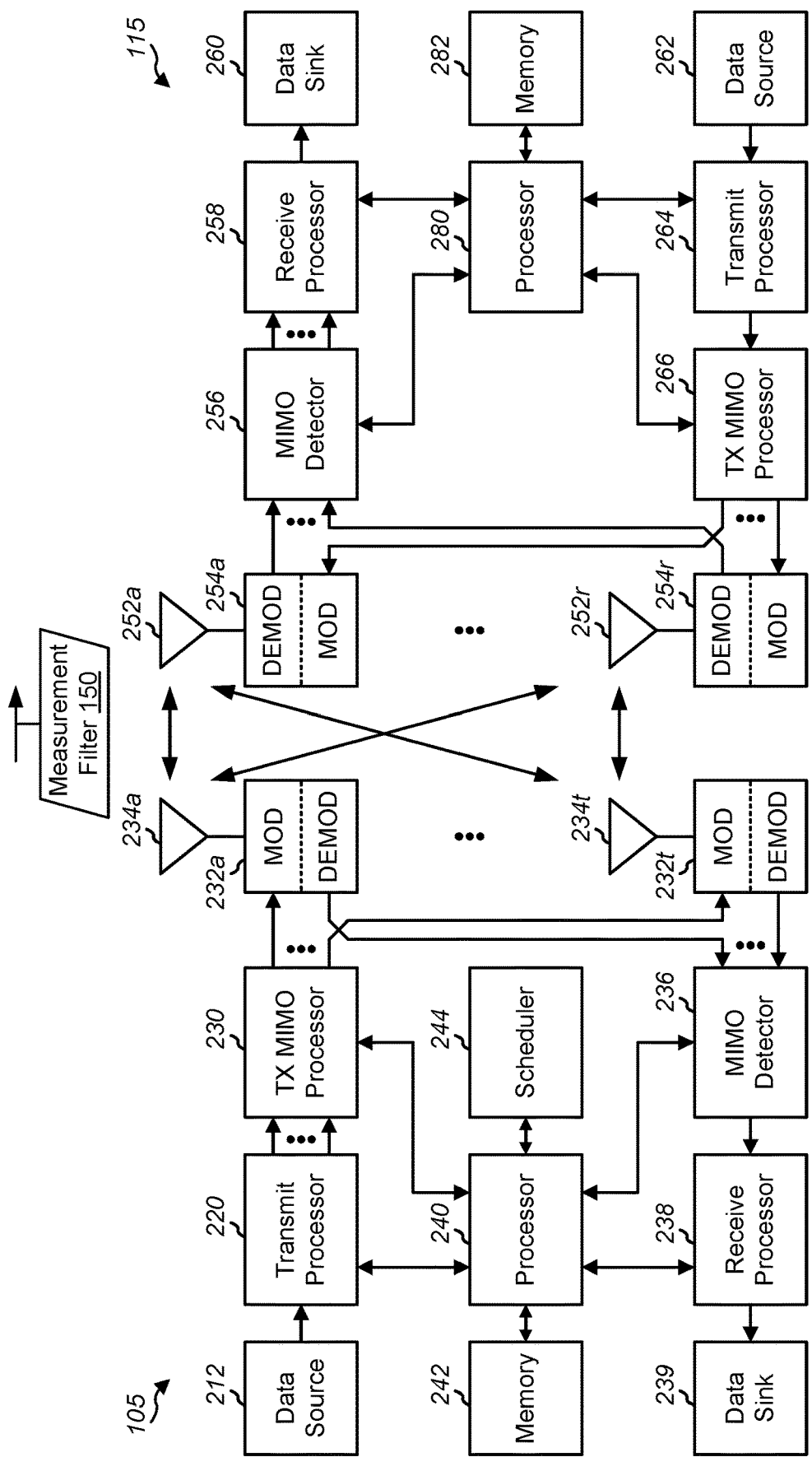
FIG. 2 is a block diagram illustrating examples of a base station and a UE according to some aspects of the disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a processor 280.

On the uplink, at the UE 115, a transmit processor 264 may receive and process data (e.g., for the PUSCH) from a data source 262 and control information (e.g., for the PUCCH) from the processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the processor 240.

The processors 240 and 280 may direct the operation at the base station 105 and the UE 115, respectively. The processor 240 and/or other processors and modules at the base station 105 may perform or direct the execution of various processes for the techniques described herein, such as transmission of an indication of the measurement filter 150. The processor 280 and/or other processors and modules at the UE 115 may also perform or direct the execution of the functional blocks illustrated in FIGS. 5 and 6 and/or other processes for the techniques described herein, such as reception of an indication of the measurement filter 150. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 of the 5G network 100 (in FIG. 1) may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

In general, four categories of LBT procedure have been suggested for sensing a shared channel for signals that may indicate the channel is already occupied. In a first category (CAT 1 LBT), no LBT or CCA is applied to detect occupancy of the shared channel. A second category (CAT 2 LBT), which may also be referred to as an abbreviated LBT, a single-shot LBT, or a 25-μs LBT, provides for the node to perform a CCA to detect energy above a predetermined threshold or detect a message or preamble occupying the shared channel. The CAT 2 LBT performs the CCA without using a random back-off operation, which results in its abbreviated length, relative to the next categories.

A third category (CAT 3 LBT) performs CCA to detect energy or messages on a shared channel, but also uses a random back-off and fixed contention window. Therefore, when the node initiates the CAT 3 LBT, it performs a first CCA to detect occupancy of the shared channel. If the shared channel is idle for the duration of the first CCA, the node may proceed to transmit. However, if the first CCA detects a signal occupying the shared channel, the node selects a random back-off based on the fixed contention window size and performs an extended CCA. If the shared channel is detected to be idle during the extended CCA and the random number has been decremented to 0, then the node may begin transmission on the shared channel. Otherwise, the node decrements the random number and performs another extended CCA. The node would continue performing extended CCA until the random number reaches 0. If the random number reaches 0 without any of the extended CCAs detecting channel occupancy, the node may then transmit on the shared channel. If at any of the extended CCA, the node detects channel occupancy, the node may re-select a new random back-off based on the fixed contention window size to begin the countdown again.

A fourth category (CAT 4 LBT), which may also be referred to as a full LBT procedure, performs the CCA with energy or message detection using a random back-off and variable contention window size. The sequence of CCA detection proceeds similarly to the process of the CAT 3 LBT, except that the contention window size is variable for the CAT 4 LBT procedure.

Use of a medium-sensing procedure to contend for access to an unlicensed shared spectrum may result in communication inefficiencies. This may be particularly evident when multiple network operating entities (e.g., network operators) are attempting to access a shared resource. In the 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
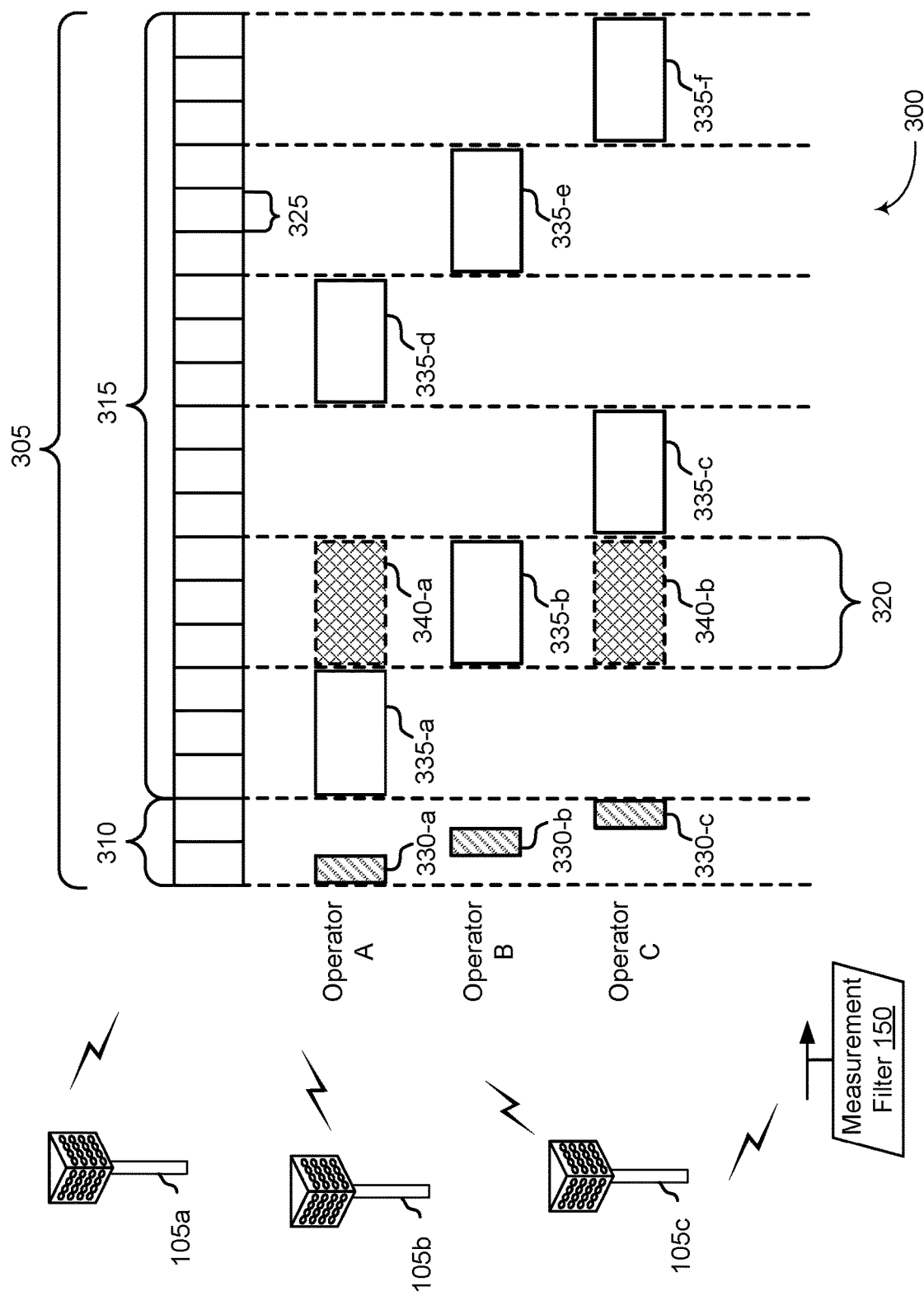
FIG. 3 is a block diagram illustrating an example of wireless communication system including base stations that use directional wireless beams according to some aspects of the disclosure.

FIG. 3 illustrates an example of a timing diagram 300 for coordinated resource partitioning. In some examples, a base station 105 may transmit an indication of the measurement filter 150 to a UE 115 in accordance with the timing diagram 300 of FIG. 3.

The timing diagram 300 includes a superframe 305, which may represent a fixed duration of time (e.g., 20 ms). The superframe 305 may be repeated for a given communication session and may be used by a wireless system such as 5G network 100 described with reference to FIG. 1. The superframe 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms). While timing diagram 300 illustrates three different network operating entities (e.g., Operator A, Operator B, Operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-a may be reserved for exclusive communications by Operator A, such as through base station 105a, resources 330-b may be reserved for exclusive communications by Operator B, such as through base station 105b, and resources 330-c may be reserved for exclusive communications by Operator C, such as through base station 105c. Since the resources 330-a are reserved for exclusive communications by Operator A, neither Operator B nor Operator C can communicate during resources 330-a, even if Operator A chooses not to communicate during those resources. That is, access to exclusive resources is limited to the designated network operator. Similar restrictions apply to resources 330-b for Operator B and resources 330-c for Operator C. The wireless nodes of Operator A (e.g., UEs 115 or base stations 105) may communicate any information desired during their exclusive resources 330-a, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-a may be prioritized for use by Operator A and may therefore be referred to as a G-INT for Operator A (e.g., G-INT-OpA). Similarly, resources 335-b may be prioritized for Operator B, (e.g., G-INT-OpB), resources 335-c (e.g., G-INT-OpC) may be prioritized for Operator C, resources 335-d may be prioritized for Operator A, resources 335-e may be prioritized for Operator B, and resources 335-f may be prioritized for Operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305. This partitioning of data may be an example of time division multiplexing (TDM). Also, when resources appear in the same sub-interval (e.g., resources 340-a and resources 335-b), these resources represent the same time resources with respect to the superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 335-a without interference from the wireless nodes of Operator B or Operator C.

A network operating entity may additionally signal to another operator that it intends to use a particular G-INT. For example, referring to resources 335-a, Operator A may signal to Operator B and Operator C that it intends to use resources 335-a. Such signaling may be referred to as an activity indication. Moreover, since Operator A has priority over resources 335-a, Operator A may be considered as a higher priority operator than both Operator B and Operator C. However, as discussed above, Operator A does not have to send signaling to the other network operating entities to ensure interference-free transmission during resources 335-a because the resources 335-a are assigned with priority to Operator A.

Similarly, a network operating entity may signal to another network operating entity that it intends not to use a particular G-INT. This signaling may also be referred to as an activity indication. For example, referring to resources 335-b, Operator B may signal to Operator A and Operator C that it intends not to use the resources 335-b for communication, even though the resources are assigned with priority to Operator B. With reference to resources 335-b, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-b may be considered an opportunistic interval (O-INT) for Operator A (e.g., O-INT-OpA). For illustrative purposes, resources 340-a may represent the O-INT for Operator A. Also, from the perspective of Operator C, the same sub-interval 320 may represent an O-INT for Operator C with corresponding resources 340-b. Resources 340-a, 335-b, and 340-b all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-b (e.g., G-INT-OpB), then Operator A may use those same resources (e.g., represented by resources 340-a) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-b) in response to an indication that Operator B was not going to use its G-INT (e.g., resources 335-b), Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously. For example, Operator A may have priority over Operator C during sub-interval 320 when Operator B is not using resources 335-b (e.g., G-INT-OpB). It is noted that in another sub-interval (not shown) Operator C may have priority over Operator A when Operator B is not using its G-INT.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-µs for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with an uplink transmission. In some examples, an ITC may contain one or more subframes 325 operating contiguously upon medium occupation. In some cases, there may be a maximum of eight network operators in an A-INT 310 (e.g., with duration of 2 ms) assuming a 250-μs transmission opportunity.

Although three operators are illustrated in FIG. 3, it should be understood that fewer or more network operating entities may be configured to operate in a coordinated manner as described above. In some cases, the location of the G-INT, O-INT, or A-INT within the superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

Figure 4:
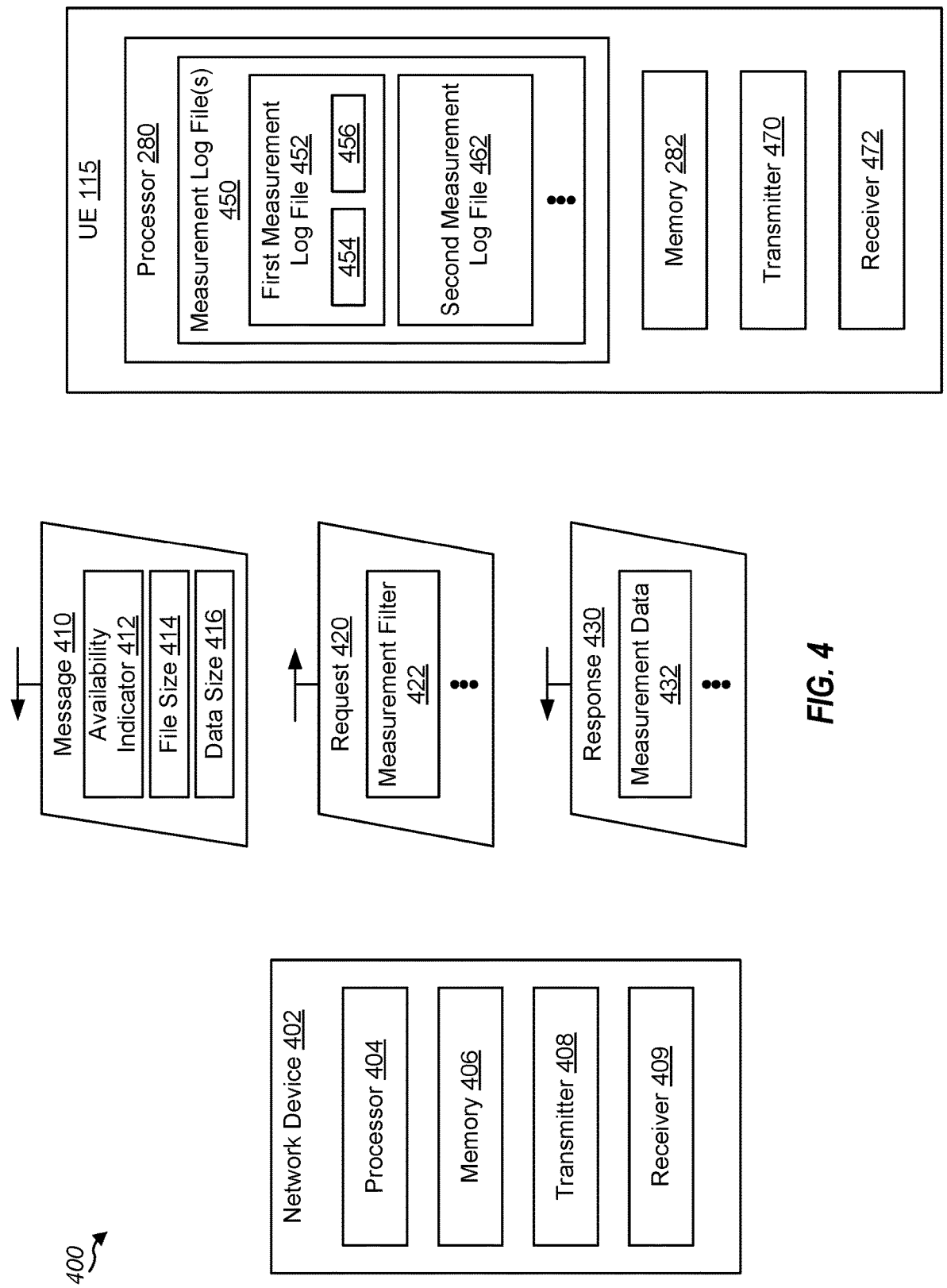
FIG. 4 is a block diagram illustrating another example of a wireless communication system according to some aspects of the disclosure.

FIG. 4 is a block diagram illustrating an example of a wireless communications system 400 according to some aspects of the disclosure. The wireless communications system 400 may include one or more UEs, such as the UE 115. The wireless communications system 400 may further include one or more network devices, such as a network device 402. In one example, the network device 402 corresponds a base station, such as the base station 105. In some other examples, the network device 402 corresponds to another device, such as wireless local area network (WLAN) communication device, as an illustrative example.

FIG. 4 illustrates that the network device 402 includes one or more processors (e.g., a processor 404) and one or more memories (e.g., a memory 406). In some examples, the processor 404 corresponds to the processor 240 of FIG. 2, and the memory 406 corresponds to the memory 242 of FIG. 2. The network device may further include a transmitter 408 and a receiver 409. The memory 406, the transmitter 408, and the receiver 409 may be coupled to the processor 404. In some examples, the transmitter 408 and the receiver 409 include one or more components described with reference to FIG. 2, such as one or more of the modulator/demodulators 232a-t, the MIMO detector 236, the receive processor 238, the transmit processor 220, or the TX MIMO processor 230. In some implementations, the transmitter 408 and the receiver 409 may be integrated in one or more transceivers of the network device 402.

The transmitter 408 may be configured to transmit reference signals, synchronization signals, control information, and data to one or more other devices, and the receiver 409 may be configured to receive reference signals, control information, and data from one or more other devices. For example, the transmitter 408 may be configured to transmit signaling, control information, and data to the UE 115, and the receiver 409 may be configured to receive signaling, control information, and data from the UE 115.

FIG. 4 also depicts that the UE 115 includes one or more processors (such as the processor 280) and one or more memories (such as the memory 282). The UE 115 may also include a transmitter 470 and a receiver 472. The memory 282, the transmitter 470, and the receiver 472 may be coupled to the processor 280. In some examples, the transmitter 470 and the receiver 472 may include one or more components described with reference to FIG. 2, such as one or more of the modulator/demodulators 254a-r, the MIMO detector 256, the receive processor 258, the transmit processor 264, or the TX MIMO processor 266. In some implementations, the transmitter 470 and the receiver 472 may be integrated in one or more transceivers of the UE 115.

The transmitter 470 may be configured to transmit reference signals, synchronization signals, control information, and data to one or more other devices, and the receiver 472 may be configured to receive reference signals, control information, and data from one or more other devices. For example, in some implementations, the transmitter 470 may be configured to transmit signaling, control information, and data to the base station 105, and the receiver 472 may be configured to receive signaling, control information, and data from the base station 105.

In some implementations, one or more of the transmitter 408, the receiver 409, the transmitter 470, or the receiver 472 may include an antenna array. The antenna array may include multiple antenna elements that perform wireless communications with other devices. In some implementations, the antenna array may perform wireless communications using different beams, also referred to as antenna beams. The beams may include transmit beams and receive beams. To illustrate, the antenna array may include multiple independent sets (or subsets) of antenna elements (or multiple individual antenna arrays), and each set of antenna elements of the antenna array may be configured to communicate using a different respective beam that may have a different respective direction than the other beams. For example, a first set of antenna elements of the antenna array may be configured to communicate via a first beam having a first direction, and a second set of antenna elements of the antenna array may be configured to communicate via a second beam having a second direction. In other implementations, the antenna array may be configured to communicate via more than two beams. In some implementations, one or more sets of antenna elements of the antenna array may be configured to concurrently generate multiple beams, for example using multiple RF chains. A set (or subset) of antenna elements may include multiple antenna elements, such as two antenna elements, four antenna elements, ten antenna elements, twenty antenna elements, or any other number of antenna elements greater than two. Although described as an antenna array, in other implementations, the antenna array may include or correspond to multiple antenna panels, and each antenna panel may be configured to communicate using a different respective beam.

In some implementations, the wireless communication system 400 operates in accordance with a 5G NR network. For example, the wireless communication system 400 may include multiple 5G-capable UEs 115 and multiple 5G-capable network devices 402, such as UEs and base stations configured to operate in accordance with a 5G NR network protocol such as that defined by the 3GPP.

During operation, the UE 115 may communicate with one or more network devices, such as the network device 402. In some examples, the UE 115 performs a plurality of network measurements to facilitate communication with the network device 402. The UE 115 may generate one or more measurement log files 450 indicating results of the plurality of network measurements. To illustrate, in some examples, the plurality of network measurements may include minimization of drive test (MDT) measurements specified by a wireless communication protocol, and the one or more measurement log files 450 may include one or more MDT measurement log files. The MDT measurements may include "immediate" mode MDT measurements that are collected by the UE 115 during operation based on a connected mode. Alternatively or in addition, the MDT measurements may include logged mode MDT measurements that are collected by the UE 115 during operation based on one or more other modes, such as an idle mode, an inactive mode, a CELL_PCH state, or a URA_PCH state. Alternatively or in addition, the MDT measurements may include accessibility measurements that include connection establishment information, such as a report of failed attempts by the UE 115 to connect to one or more of an LTE wireless network, a UMTS wireless network, or an NR wireless network.

In FIG. 4, the one or more measurement log files 450 may include multiple measurement log files, such as a first measurement log file 452 and a second measurement log file 462. In some other examples, the one or more measurement log files 450 may correspond to a single measurement log file.

In some examples, the UE 115 may transmit a message 410 indicating one or more parameters of the one or more measurement log files 450. For example, the UE 115 may transmit the message 410 to the network device 402 to indicate one or more of availability of the one or more measurement log files 450 (e.g., using an availability indicator 412), a file size 414 of the one or more measurement log files 450, or a data size 416 of one or more portions of the one or more measurement log files 450. In one example, the data size 416 indicates a data size associated with a particular measurement type of the one or more measurement log files 450, as described further below.

In some implementations, the UE 115 may establish a radio resource control (RRC) connection with the network device 402 and may transmit the message 410 in response to establishing the RRC connection. For example, the message 410 may correspond to an RRC setup completion message indicating completion of the RRC connection with the network device 402. As another example, the message 410 may correspond to an RRC resume completion indicating resumption of the RRC connection with the network device 402.

The UE 115 may receive a request 420 from the network device 402. In some examples, the network device 402 may send the request 420 to the UE 115 based on receiving the message 410. The request 420 may indicate one or more measurement filters, such as a measurement filter 422 (e.g., the measurement filter 150). In some examples, the network device 402 selects the measurement filter based on information indicated by the message 410, such as one or more of the availability indicator 412, the file size 414, or the data size 416.

In response to receiving the request 420, the UE 115 may apply the measurement filter 422 to the one or more measurement log files 450 to select measurement data 432 from the one or more measurement log files 450. The UE 115 may transmit the measurement data 432 to the network device 402 in a response 430 to the request 420.

To illustrate, in one example, the measurement data 432 includes first measurement results 454 of the one or more measurement log files 450 selected based on the measurement filter 422 and excludes second measurement results 456 of the one or more measurement log files 450 based on the measurement filter 422. In this example, the second measurement results 456 may be "filtered out" from the measurement data 432 based on the measurement filter 422.

In some examples, the request 420 indicates that the measurement filter 422 is associated with a particular measurement log file of the one or more measurement log files 450. For example, the message 410 may identify each measurement log file of the one or more measurement log files 450 (e.g., using index values), and the request 420 may indicate (e.g., using a particular index value) a particular measurement log file, such as the first measurement log file 452, as an illustrative example. In this example, the UE 115 may select the measurement data 432 from the first measurement log file 452. Accordingly, in some examples, the measurement filter 422 may be specific to a particular measurement log file, such as the first measurement log file 452.

In some other examples, the measurement filter 422 may be common to multiple measurement log files. For example, the request 420 may indicate that the measurement filter 422 is to be applied to each measurement log of the one or more measurement log files 450. In this case, the UE 115 may select the measurement data from each measurement log of the one or more measurement log files 450 based on the request 420 (e.g., by selecting a first portion of the measurement data 432 from the first measurement log file 452 and by selecting a second portion of the measurement data 432 from the second measurement log file 462).

In some implementations, the measurement filter 422 indicates one or more of a measurement type of the measurement data 432, a segmentation scheme associated with the measurement data 432, a measurement object associated with the measurement data 432, or a measurement identifier (ID) associated with the measurement data 432. In some examples, each measurement type is segmented per measurement object associated with the measurement type per measurement ID associated with the measurement type. As an illustrative example, a measurement type may correspond to a network quality measurement, such as a random access (RA) report associated with a random access channel (RACH), or a radio link measurement, such as a radio link failure (RLF) report. In some examples, a measurement object may indicate one or more target resources, such as a range of carrier frequencies, a range of time slots or symbols, or both. In some examples, a measurement ID may indicate a range of cells or particular measurement identities, such as one or more particular synchronization signal block (SSB) IDs or one or more channel state information reference signal (CSI-RS) resource measurement IDs, as illustrative examples.

In some examples, the request 420 indicates that the UE 115 is to provide a list of measurement objects associated with the one or more measurement log files 450, of measurement IDs associated with the one or more measurement log files 450, or both. In this example, the UE 115 may include the list in the response 430. In some cases, the list enables the network device 402 to selectively request certain data (such as particular measurement objects) instead of transferring all of the data "in bulk," which may slow network performance in some cases.

To further illustrate some examples in accordance with certain aspects of the disclosure, the measurement filter 422 may indicate a particular measurement log type. The UE 115 may parse the one or more measurement log files 450 to identify the particular measurement log type. The UE 115 may select the measurement data 432 for inclusion in the response 430 based on determining that the measurement data 432 indicates the particular measurement log type.

Alternatively or in addition, in some examples, the UE 115 parses the one or more measurement log files 450 based on a segmentation scheme. In one example, the segmentation scheme is predefined using one or more configuration messages. The UE 115 may select the measurement data 432 based on determining that the measurement data 432 satisfies one or more criteria specified by the segmentation scheme.

Alternatively or in addition, the measurement filter 422 may indicate a particular measurement object. The UE 115 may parse the one or more measurement log files 450 to identify the particular measurement object. The UE 115 may select the measurement data 432 determining that the measurement data 432 indicates the particular measurement object.

Alternatively or in addition, the measurement filter 422 may indicate a particular measurement ID. The UE 115 may parse the one or more measurement log files 450 to identify the particular measurement ID. The UE 115 may select the measurement data 432 for inclusion in the response 430 based on determining that the measurement data 432 indicates the particular measurement ID.

In some examples, the response 430 includes an availability message indicating availability of additional measurement results of the one or more measurement log files 450. To illustrate, in one example, the availability message identifies that the second measurement results 456 are available (and are excluded from the response 430 based on the measurement filter 422). In another example, the response 430 may be associated with a maximum data size. In this case, if a data size of the measurement data 432 exceeds the maximum data size, the response 430 may include a portion of the measurement data 432 and may indicate availability of a remainder of the measurement data 432.

In some examples, prioritization within different measurement log files may be determined based on measurement type. To illustrate, the measurement filter 422 may indicate that a first measurement type is associated with a first priority that is greater than a second priority associated with a second measurement type. The UE 115 may select the first measurement results 454 or inclusion in the response 430 based on determining that the first measurement results 454 are associated with the first measurement type (and therefore have a greater priority than the second measurement results 456). The UE 115 may exclude the second measurement results 456 from the response 430 based on determining that the second measurement results 456 are associated with the second measurement type (and therefore have less priority as compared to the first measurement results 454).

In some examples, each segment within a measurement of the one or more measurement log files 450 may include one or more measurement elements that are separately extractable. To illustrate, the request 420 may configure the UE 115 with one or more measurement types and, for each measurement type of the one or more measurement types, one or more segments within the measurement type based on different key performance indicators (KPIs). For each measurement type, each segment of the one or more segments may be extractable independently of other segments. In some examples, the request 420 configures the UE 115 with M measurement types (where M indicates a positive integer) and $\{N\_1, N\_2, \ldots, N\_(K\_i)\}$ segments (where $\forall i \in M$) within each measurement type.

In some aspects, the measurement filter 422 specifies a segmentation scheme. To illustrate, the measurement filter 422 may specify segmentation of the one or more measurement log files 450 according to information element, frequency, carrier, cell identifier (ID), cell list (e.g., a "blacklist" or a "whitelist"), measurement quantity, time range, or byte range.

In some implementations, the request 420 includes a bitmap having a plurality of bits each associated with a respective request element. The plurality of bits may indicate (e.g., for a particular measurement log file) whether the respective request element is requested from the UE 115. In some other examples, the request 420 may be associated with a hypertext transfer protocol (HTTP) format and may include a byte range requesting one or more request elements. In some examples, a request element may indicate an area configuration (also referred to herein as an area scope) that is associated with a particular group of cells or a particular geographic region. Alternatively or in addition, a request element may indicate a carrier frequency (or a range of carrier frequencies).

In some examples, the measurement filter 422 may indicate a measurement type for the response 430 and a segment ID for the response 430, and the response 430 indicates availability information associated with the measurement type, the segment ID, or both. In this case, the UE 115 may select the measurement data 432 based on a determination that the measurement data 432 is associated with the measurement type, with the segment ID, or both, and may further indicate availability of additional measurement data associated with the measurement type, with the segment ID, or both. To illustrate, in one example, the response 430 indicates availability of additional measurements associated with measurement type. In another example, the response 430 indicates availability of additional measurements associated with one or more other measurement types different than the measurement type. In another example, the response 430 indicates a data size of measurement data of the one or more measurement log files 450 associated with the measurement type.

The network device 402 may perform one or more operations associated with the wireless communication system 400 based on the measurement data 432. To illustrate, depending on the particular example, the network device 402 may adjust network performance, make scheduling decisions, adjust a transmit power level of the UE 115, adjust a transmit power level of network device 402, change a transmission mode, or change a multiple access scheme based on the measurement data 432.

To further illustrate, in some examples, the message 410 may correspond to an RRCSetupComplete message, and in some other examples, the message 410 may correspond to an RRCResumeComplete message. In some examples, the request 420 may be referred to as a UEInformationRequest, and in some other examples, the response 430 may be referred to as a UEInformationResponse.

One or more aspects described with reference to FIG. 4 may improve performance of a wireless communication system. For example, by selectively communicating the measurement data 432 (instead of the entire contents of the one or more measurement log files 450), an amount of data communicated from the UE 115 to the network device 402 may be reduced in cases. As a result, delays associated with communication of other signals or messages (such as NAS messages) may be reduced or avoided. As another example, in some cases, an amount of measurement data 432 received, stored, and analyzed by the network device 402 may be reduced. As a result, an amount storage and processing resources of the network device 402 used for the measurement data 432 may be reduced in some cases.

Figures 5, 6:
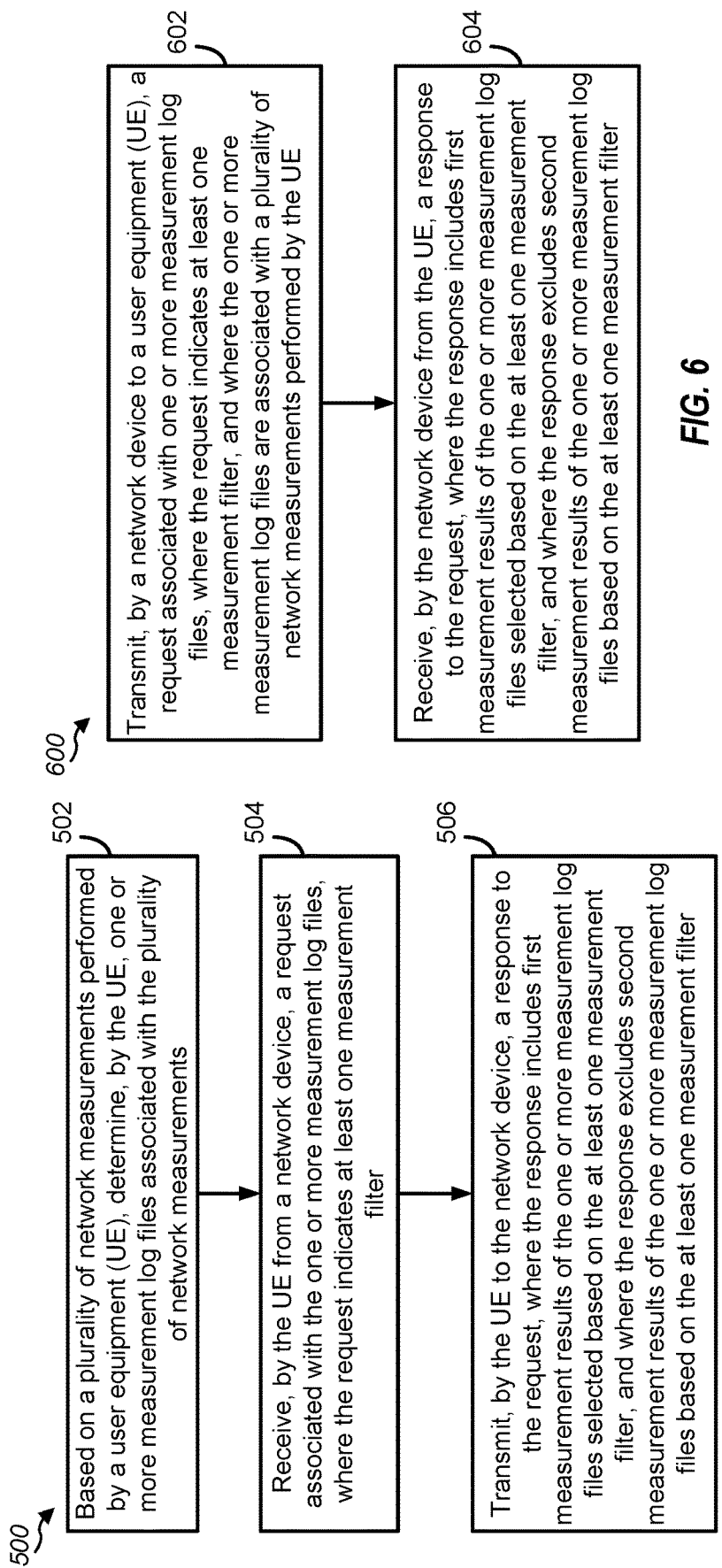
FIG. 5 is a flow chart illustrating an example of a method of wireless communication that may be performed by a UE according to some aspects of the disclosure.
FIG. 6 is a flow chart illustrating an example of a method of wireless communication that may be performed by a base station according to some aspects of the disclosure.

FIG. 5 illustrates an example of a method 500 of wireless communication that may be performed by a UE according to some aspects of the disclosure. In some examples, the method 500 is performed by the UE 115.

The method 500 includes determining, based on a plurality of network measurements performed by a UE, one or more measurement log files associated with the plurality of network measurements, at 502. For example, the UE 115 may perform a plurality of network measurements to generate the one or more measurement log files 450.

The method 500 further includes receiving, by the UE from a network device, a request associated with the one or more measurement log files, at 504. The request indicates at least one measurement filter. For example, the UE 115 may receive the request 420 from the network device 402, and the request 420 may indicate the measurement filter 422.

The method 500 further includes transmitting, by the UE to the network device, a response to the request, at 506. The response includes first measurement results of the one or more measurement log files selected based on the at least one measurement filter and excludes second measurement results of the one or more measurement log files based on the at least one measurement filter. For example, the UE 115 may transmit the response 430 to the network device 402. The response 430 may include the measurement data 432. In one example, the measurement data 432 includes the first measurement results 454 selected based on the measurement filter 422 and excludes the second measurement results 456 based on the measurement filter 422.

FIG. 6 illustrates an example of a method 600 of wireless communication that may be performed by a network device according to some aspects of the disclosure. In some examples, the method 600 is performed by the network device 402. The network device 402 may correspond to the base station 105 or another network device.

The method 600 includes transmitting, by a network device to a UE, a request associated with one or more measurement log files, at 602. The request indicates at least one measurement filter, and the one or more measurement log files are associated with a plurality of network measurements performed by the UE. For example, network device 402 may transmit the request 420 to the UE 115, and the request 420 may indicate the measurement filter 422.

The method 600 further includes receiving, from the UE by the network device, a response to the request, at 604. The response includes first measurement results of the one or more measurement log files selected based on the at least one measurement filter and excludes second measurement results of the one or more measurement log files based on the at least one measurement filter. For example, the network device 402 may receive the response 430 from the UE 115. The response 430 may include the measurement data 432. In one example, the measurement data 432 includes the first measurement results 454 selected based on the measurement filter 422 and excludes the second measurement results 456 based on the measurement filter 422.

Figure 7:
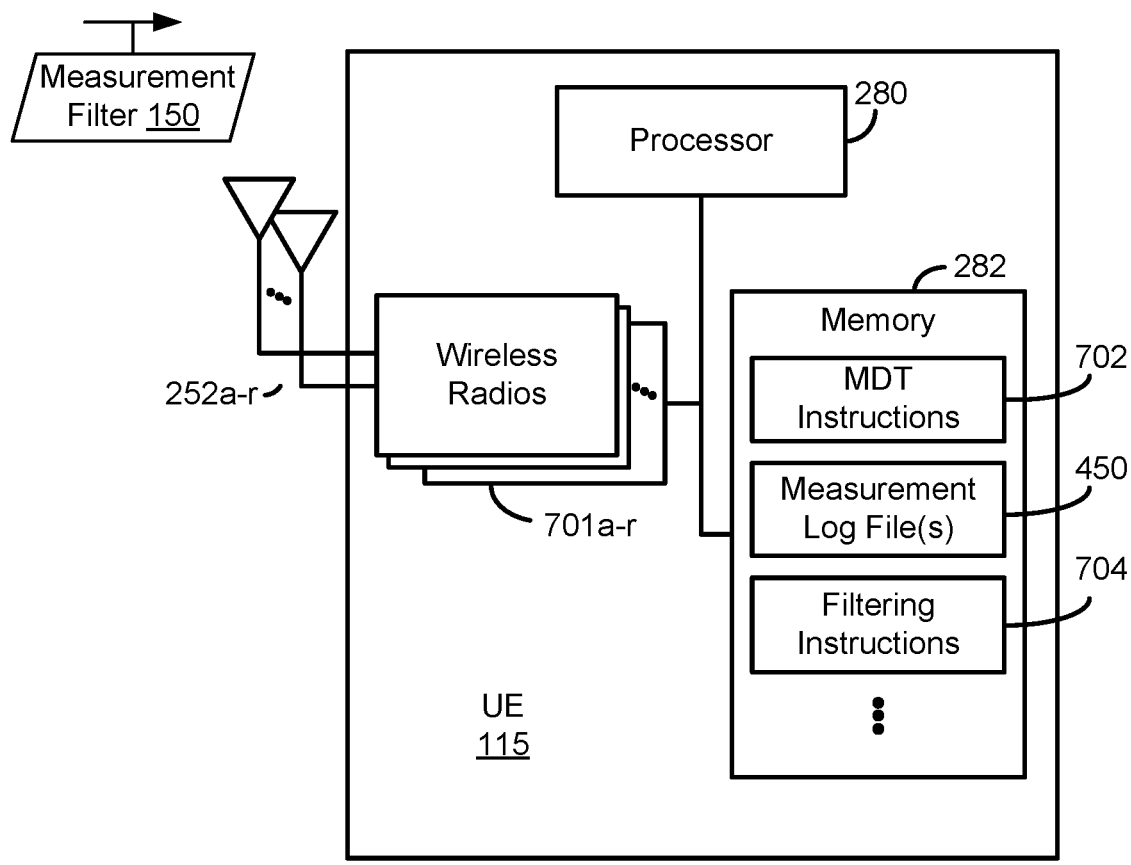
FIG. 7 is a block diagram illustrating an example of a UE according to some aspects of the disclosure.

FIG. 7 is a block diagram illustrating an example of the UE 115 according to some aspects of the disclosure. The UE 115 may include one or more features described with reference to FIG. 2. For example, the UE 115 includes the processor 280, which is configured to execute instructions stored in the memory 282 to initiate, perform, or control one or more operations described herein, such as reception of an indication of the measurement filter 150. The UE 115 may transmit and receive signals via wireless radios 701a-r and antennas 252a-r. The wireless radios 701a-r may include one or more components illustrated in FIG. 2, such as the modulator/demodulators 254a-r, the MIMO detector 256, the receive processor 258, the transmit processor 264, the TX MIMO processor 266, one or more other components, or a combination thereof.

The memory 282 may store instructions executable by the processor 280 to perform, initiate, or control one or more operations described herein. To illustrate, the memory 282 may store MDT instructions 702 executable by the processor 280 to perform MDT measurements, to generate MDT measurement reports (e.g., the one or more measurement log files 450), to transmit an MDT measurement report, to perform one or more other operations, or a combination thereof. In one example, the memory 282 stores filtering instructions 704, and the processor 280 may execute the filtering instructions to select the measurement data 432 to be included in the response 430.

Figure 8:
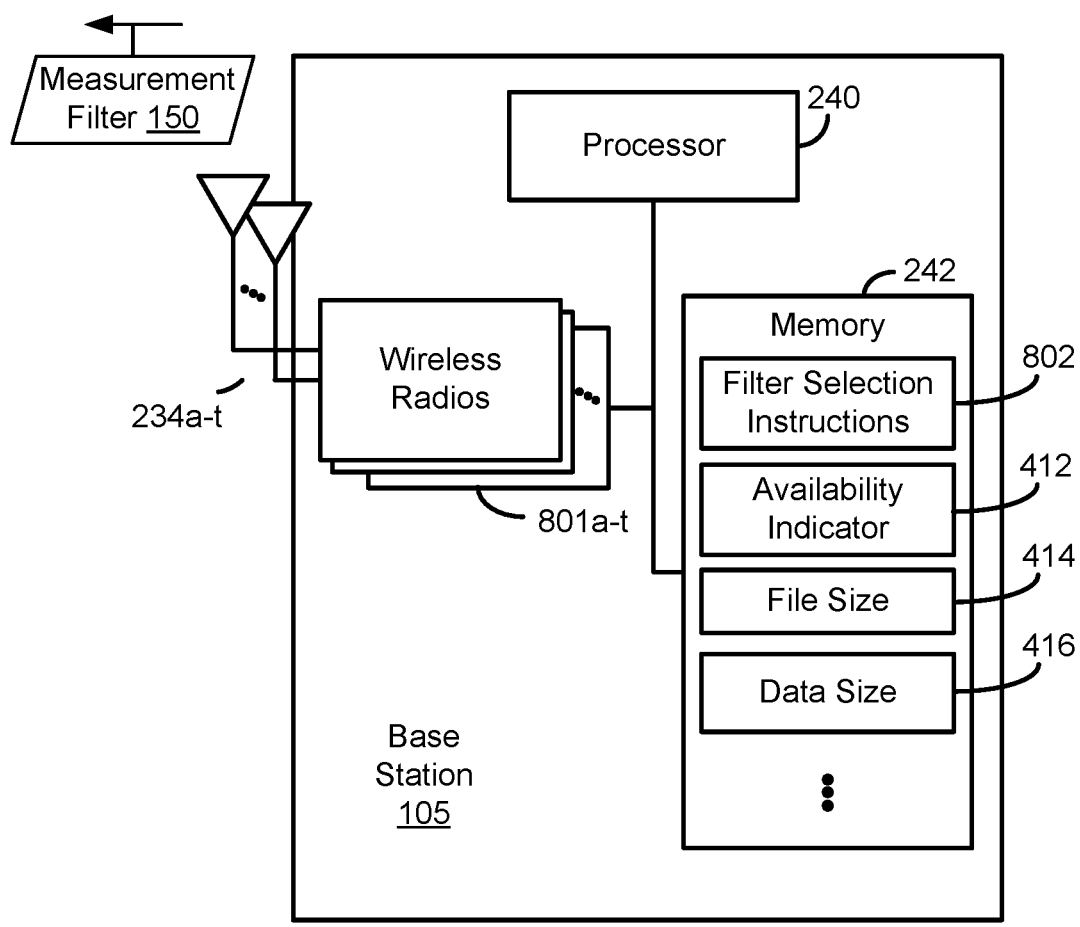
FIG. 8 is a block diagram illustrating an example of a base station according to some aspects of the disclosure.

FIG. 8 is a block diagram an example of the base station 105 according to some aspects of the disclosure. One or more features of the network device 402 of FIG. 4 may correspond to the base station 105. Further, one or more features of the base station 105 may be as described with reference to FIG. 2. For example, the base station 105 includes the processor 240, which is configured to execute instructions stored in the memory 242 to initiate, perform, or control one or more operations described herein, such as transmission of an indication of the measurement filter 150. The base station 105 may transmit and receive signals via wireless radios 801a-t and antennas 234a-t. The wireless radios 801a-t may include one or more components illustrated in FIG. 2, such as the modulator/demodulators 232a-t, the MIMO detector 236, the receive processor 238, the transmit processor 220, the TX MIMO processor 230, one or more other components, or a combination thereof.

The memory 242 may store instructions executable by the processor 240 to perform, initiate, or control one or more operations described herein. To illustrate, the memory 242 may store filter selection instructions 802 executable by the processor 240 to select the measurement filter 422. In some examples, the processor 240 executes the filter selection instructions 802 to select the measurement filter 422 based on information included in the message 410, such as one or more of the availability indicator 412, the file size 414, or the data size 416, as illustrative examples.

To further illustrate some aspects of the disclosure, in a first aspect, an apparatus for wireless communication includes a receiver and a transmitter. The receiver is configured to perform a plurality of network measurements associated with one or more measurement log files and is further configured to receive, from a network device, a request associated with the one or more measurement log files. The request indicates at least one measurement filter. The transmitter is configured to transmit, to the network device, a response to the request. The response includes first measurement results of the one or more measurement log files selected based on the at least one measurement filter, and the response excludes second measurement results of the one or more measurement log files based on the at least one measurement filter.

In a second aspect alternatively or in addition to the first aspect, the transmitter is further configured, based on a radio resource control (RRC) connection with the network device, to transmit a message to the network device to confirm the RRC connection, the message indicates one or more of availability of the one or more measurement log files, a file size of the one or more measurement log files, or a data size of one or more portions of the one or more measurement log files, and the receiver is further configured to receive the request in response to the message.

In a third aspect alternatively or in addition to one or more of the first through second aspects, the message corresponds to an RRC setup completion message.

In a fourth aspect alternatively or in addition to one or more of the first through third aspects, the message corresponds to an RRC resume completion message.

In a fifth aspect alternatively or in addition to one or more of the first through fourth aspects, the request indicates that the at least one measurement filter is associated with a particular measurement log of the one or more measurement log files, and the first measurement results are selected from the particular measurement log based on the request.

In a sixth aspect alternatively or in addition to one or more of the first through fifth aspects, the request indicates that the at least one measurement filter is to be applied to each measurement log of the one or more measurement log files, and the first measurement results are selected from each measurement log of the one or more measurement log files based on the request.

In a seventh aspect alternatively or in addition to one or more of the first through sixth aspects, the at least one measurement filter indicates one or more of a measurement type of the first measurement results, a segmentation scheme associated with the first measurement results, a measurement object associated with the first measurement results, or a measurement identifier (ID) associated with the first measurement results.

In an eighth aspect alternatively or in addition to one or more of the first through seventh aspects, for each measurement type, each measurement type is segmented per measurement object associated with the measurement type per measurement ID associated with the measurement type.

In a ninth aspect alternatively or in addition to one or more of the first through eighth aspects, the at least one measurement filter indicates to provide a list, the list indicates one or more of measurement objects associated with the one or more measurement log files or measurement identifiers (IDs) associated with the one or more measurement log files, and the response includes the list.

In a tenth aspect alternatively or in addition to one or more of the first through ninth aspects, a method of wireless communication includes, based on a plurality of network measurements performed by a user equipment (UE), determining, by the UE, one or more measurement log files associated with the plurality of network measurements. The method further includes receiving, by the UE from a network device, a request associated with the one or more measurement log files. The request indicates at least one measurement filter. The method further includes transmitting, by the UE to the network device, a response to the request. The response includes first measurement results of the one or more measurement log files selected based on the at least one measurement filter, and the response excludes second measurement results of the one or more measurement log files based on the at least one measurement filter.

In an eleventh aspect alternatively or in addition to one or more of the first through tenth aspects, the at least one measurement filter indicates a particular measurement log type, and the method includes: parsing the one or more measurement log files to identify the particular measurement log type; and selecting the first measurement results for inclusion in the response based on determining that the first measurement results indicate the particular measurement log type.

In a twelfth aspect alternatively or in addition to one or more of the first through eleventh aspects, the method further includes: parsing the one or more measurement log files based on a segmentation scheme; and selecting the first measurement results for inclusion in the response based on determining that the first measurement results satisfy one or more criteria specified by the segmentation scheme.

In a thirteenth aspect alternatively or in addition to one or more of the first through twelfth aspects, the at least one measurement filter indicates a particular measurement object, and the method includes: parsing the one or more measurement log files to identify the particular measurement object; and selecting the first measurement results for inclusion in the response based on determining that the first measurement results indicate the particular measurement object.

In a fourteenth aspect alternatively or in addition to one or more of the first through thirteenth aspects, the request indicates a particular measurement identifier (ID), and the method includes: parsing the one or more measurement log files to identify the particular measurement ID; and selecting the first measurement results for inclusion in the response based on determining that the first measurement results indicate the particular measurement ID.

In a fifteenth aspect alternatively or in addition to one or more of the first through fourteenth aspects, the UE transmits the first measurement results with an availability message indicating availability of additional measurement results.

In a sixteenth aspect alternatively or in addition to one or more of the first through fifteenth aspects, the at least one measurement filter indicates that a first measurement type is associated with a first priority that is greater than a second priority associated with a second measurement type, the UE selects the first measurement results for inclusion in the response based on determining that the first measurement results are associated with the first measurement type, and the UE excludes the second measurement results from the response based on determining that the second measurement results are associated with the second measurement type.

In a seventeenth aspect alternatively or in addition to one or more of the first through sixteenth aspects, the request configures the UE with one or more measurement types and, for each measurement type of the one or more measurement types, one or more segments within the measurement type based on different key performance indicators (KPIs).

In an eighteenth aspect alternatively or in addition to one or more of the first through seventeenth aspects, for each measurement type, each segment of the one or more segments is extractable independently of other segments.

In a nineteenth aspect alternatively or in addition to one or more of the first through eighteenth aspects, the at least one measurement filter specifies segmentation of the one or more measurement log files according to information element, frequency, carrier, cell identifier (ID), cell list, measurement quantity, time range, or byte range.

In a twentieth aspect alternatively or in addition to one or more of the first through nineteenth aspects, the request includes a bitmap including a plurality of bits each associated with a respective request element.

In a twenty-first aspect alternatively or in addition to one or more of the first through twentieth aspects, the request has a hypertext transfer protocol (HTTP) format and includes a byte range requesting one or more request elements.

In a twenty-second aspect alternatively or in addition to one or more of the first through twenty-first aspects, the at least one measurement filter indicates a measurement type for the response and a segment identifier (ID) for the response.

In a twenty-third aspect alternatively or in addition to one or more of the first through twenty-second aspects, the UE selects the first measurement results based on a determination that the first measurement results are associated with the measurement type and with the segment ID.

In a twenty-fourth aspect alternatively or in addition to one or more of the first through twenty-third aspects, the response indicates availability of additional measurements associated with measurement type.

In a twenty-fifth aspect alternatively or in addition to one or more of the first through twenty-fourth aspects, the response indicates availability of additional measurements associated with one or more other measurement types different than the measurement type.

In a twenty-sixth aspect alternatively or in addition to one or more of the first through twenty-fifth aspects, the response indicates a data size of measurement data of the one or more measurement log files associated with the measurement type.

In a twenty-seventh aspect alternatively or in addition to one or more of the first through twenty-sixth aspects, an apparatus for wireless communication includes a transmitter configured to transmit, to a user equipment (UE), a request associated with one or more measurement log files. The request indicates at least one measurement filter, and the one or more measurement log files are associated with a plurality of network measurements performed by the UE. The apparatus further includes a receiver configured to receive, from the UE, a response to the request. The response includes first measurement results of the one or more measurement log files selected based on the at least one measurement filter, and the response excludes second measurement results of the one or more measurement log files based on the at least one measurement filter.

In a twenty-eighth aspect alternatively or in addition to one or more of the first through twenty-seventh aspects, the one or more measurement log files include one or more minimization of drive test (MDT) measurement log files.

In a twenty-ninth aspect alternatively or in addition to one or more of the first through twenty-eighth aspects, a method of wireless communication includes transmitting, by a network device to a user equipment (UE), a request associated with one or more measurement log files. The request indicates at least one measurement filter, and the one or more measurement log files are associated with a plurality of network measurements performed by the UE. The method further includes receiving, from the UE by the network device, a response to the request. The response includes first measurement results of the one or more measurement log files selected based on the at least one measurement filter, and the response excludes second measurement results of the one or more measurement log files based on the at least one measurement filter.

In a thirtieth aspect alternatively or in addition to one or more of the first through twenty-ninth aspects, the method includes, prior to receiving the request, establishing a radio resource control (RRC) connection with the network device; and in response to establishing the RRC connection with the network device, transmitting a message to the network device to confirm the RRC connection. The message indicates one or more of availability of the one or more measurement log files, a file size of the one or more measurement log files, or a data size of one or more portions of the one or more measurement log files, and the UE receives the request in response to the message.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein may include processors, electronics devices, hardware devices, electronics components, logical circuits, memories, software codes, firmware codes, etc., or any combination thereof.

Those of skill would further appreciate that the various illustrative logical blocks, modules, circuits, and operations described herein may be implemented as electronic hardware, computer software, or combinations of both. To illustrate, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The operations of a method or process described herein may implemented using hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus for wireless communication by a user equipment (UE), the apparatus comprising:
    a receiver;
    a transmitter; and
    at least one processor coupled to the receiver and the transmitter, wherein the apparatus is configured to:
        perform a plurality of network measurements associated with one or more measurement log files;
        transmit, to a network device, a message indicating one or more of a file size of the one or more measurement log files or a data size of one or more portions of the one or more measurement log files;
        receive, from the network device based on the message, a request associated with the one or more measurement log files, wherein the request indicates at least one measurement filter to be applied to the one or more measurement log files after generation of the one or more measurement log files; and
        transmit, to the network device, a response to the request, wherein the response includes, based on the at least one measurement filter, first measurement results of the one or more measurement log files, and wherein the response excludes, based on the at least one measurement filter, second measurement results of the one or more measurement log files.

2. The apparatus of claim 1, wherein apparatus is configured, based on a radio resource control (RRC) connection with the network device, to transmit the message to the network device to confirm the RRC connection, and wherein the message indicates availability of the one or more measurement log files.

3. The apparatus of claim 1, wherein the message corresponds to an RRC setup completion message.

4. The apparatus of claim 1, wherein the message corresponds to an RRC resume completion message.

5. The apparatus of claim 1, wherein the request indicates that the at least one measurement filter is associated with a particular measurement log of the one or more measurement log files.

6. The apparatus of claim 1, wherein the request indicates that the at least one measurement filter is to be applied to each measurement log of the one or more measurement log files.

7. The apparatus of claim 1, wherein the at least one measurement filter indicates one or more of a measurement type of the first measurement results, a segmentation scheme associated with the first measurement results, a measurement object associated with the first measurement results, or a measurement identifier (ID) associated with the first measurement results.

8. The apparatus of claim 7, wherein, for each measurement type, each measurement type is segmented per measurement object associated with the measurement type per measurement ID associated with the measurement type.

9. The apparatus of claim 1, wherein the at least one measurement filter indicates to provide a list, wherein the list includes one or more of measurement objects associated with the one or more measurement log files or measurement identifiers (IDs) associated with the one or more measurement log files, and wherein the response includes the list.

10. A method of wireless communication performed by a user equipment (UE), the method comprising:
    performing a plurality of network measurements associated with one or more measurement log files;
    transmitting, to a network device, a message indicating one or more of a file size of the one or more measurement log files or a data size of one or more portions of the one or more measurement log files;
    receiving, from the network device based on the message, a request associated with the one or more measurement log files, wherein the request indicates at least one measurement filter to be applied to the one or more measurement log files after generating the one or more measurement log files; and transmitting, to the network device, a response to the request, wherein the response includes, based on the at least one measurement filter, first measurement results of the one or more measurement log files, and wherein the response excludes, based on the at least one measurement filter, second measurement results of the one or more measurement log files.

11. The method of claim 10, wherein the response includes, based on a particular measurement log type indicated by the at least one measurement filter, the first measurement results.

12. The method of claim 10, wherein the response includes, based on one or more criteria associated with a segmentation scheme, the first measurement results.

13. The method of claim 10, wherein the response includes, based on a particular measurement object indicated by the at least one measurement filter, the first measurement results.

14. The method of claim 10, wherein the response includes, based on a particular measurement identifier (ID) indicated by the request, the first measurement results.

15. The method of claim 10, further comprising transmitting an availability message indicating availability of additional measurement results.

16. The method of claim 10, wherein the at least one measurement filter indicates that a first measurement type is associated with a first priority that is greater than a second priority associated with a second measurement type, wherein the response includes, based on the first measurement type, the first measurement results, and wherein the response excludes, based on the second measurement type, the second measurement results.

17. The method of claim 10, wherein the request indicates one or more measurement types and indicates, for each measurement type of the one or more measurement types, one or more segments within the measurement type based on different key performance indicators (KPIs).

18. The method of claim 17, wherein, for each measurement type, each segment of the one or more segments is extractable independently of other segments.

19. The method of claim 10, wherein the at least one measurement filter specifies segmentation of the one or more measurement log files according to information element, frequency, carrier, cell identifier (ID), cell list, measurement quantity, time range, or byte range.

20. The method of claim 10, wherein the request includes a bitmap including a plurality of bits each associated with a respective request element.

21. The method of claim 10, wherein the request has a hypertext transfer protocol (HTTP) format and includes a byte range requesting one or more request elements.

22. The method of claim 10, wherein the at least one measurement filter indicates a measurement type for the response and a segment identifier (ID) for the response.

23. The method of claim 22, wherein the response includes, based on the measurement type and the segment ID, the first measurement results.

24. The method of claim 23, wherein the response indicates availability of additional measurements associated with measurement type.

25. The method of claim 23, wherein the response indicates availability of additional measurements associated with one or more other measurement types different than the measurement type.

26. The method of claim 23, wherein the response indicates a particular data size of particular measurement data of the one or more measurement log files based on the particular measurement data being associated with the measurement type.

27. An apparatus for wireless communication, the apparatus comprising:
a receiver configured to receive, from a user equipment (UE), a message indicating one or more of a file size of one or more measurement log files or a data size of one or more portions of the one or more measurement log files; and
a transmitter configured to transmit, to the UE based on the message, a request associated with the one or more measurement log files, wherein the request indicates at least one measurement filter to be applied to the one or more measurement log files after generation of the one or more measurement log files, and wherein the one or more measurement log files are associated with a plurality of network measurements performed by the UE,
wherein the receiver is further configured to receive, from the UE, a response to the request, wherein the response includes, based on the at least one measurement filter, first measurement results of the one or more measurement log files, and wherein the response excludes, based on the at least one measurement filter, second measurement results of the one or more measurement log files.

28. The apparatus of claim 27, wherein the one or more measurement log files include one or more minimization of drive test (MDT) measurement log files.

29. A method of wireless communication performed by a network device, the method comprising:
receiving, from a user equipment (UE), a message indicating one or more of a file size of one or more measurement log files or a data size of one or more portions of the one or more measurement log files; and
transmitting, to the UE based on the message, a request associated with the one or more measurement log files, wherein the request indicates at least one measurement filter to be applied to the one or more measurement log files after generating the one or more measurement log files, and wherein the one or more measurement log files are associated with a plurality of network measurements performed by the UE; and
receiving, from the UE, a response to the request, wherein the response includes, based on the at least one measurement filter, first measurement results of the one or more measurement log files, and wherein the response excludes, based on the at least one measurement filter, second measurement results of the one or more measurement log files.

30. The method of claim 29, further comprising:
prior to receiving the request, establishing a radio resource control (RRC) connection with the UE; and
in accordance with establishing the RRC connection with the UE, receiving the message from the UE confirming the RRC connection, wherein the message indicates availability of the one or more measurement log files.

* * * * *